United States Patent [19]

Wheeler

[11] Patent Number: 5,034,269
[45] Date of Patent: Jul. 23, 1991

[54] PROCESS FOR THE MANUFACTURE OF PAINT-COATED FILM AND PRODUCT PRODUCED THEREFROM

[76] Inventor: Richard W. Wheeler, c/o Eastman Kodak Co., Rochester, N.Y. 14650-2201

[21] Appl. No.: 504,213

[22] Filed: Apr. 4, 1990

[51] Int. Cl.⁵ .............................................. B32B 7/12
[52] U.S. Cl. ........................... 428/317.3; 427/207.1; 427/208.2; 427/208.4; 428/317.5; 428/343; 428/354
[58] Field of Search .................. 428/36.5, 317.3, 317.5, 428/343, 354; 427/207.1, 208.2, 208.4

[56] References Cited

U.S. PATENT DOCUMENTS

| | | | |
|---|---|---|---|
| 3,380,866 | 4/1968 | Glinter | 156/79 |
| 3,523,846 | 8/1970 | Muller | 156/78 |
| 3,551,232 | 12/1970 | Thompson | 156/87 |
| 4,059,466 | 11/1977 | Scholl et al. | 156/78 |
| 4,059,714 | 11/1977 | Scholl et al. | 428/317.5 |
| 4,156,754 | 5/1979 | Cobbs | 428/317.5 |
| 4,264,657 | 4/1981 | Tollette | 428/36.5 |
| 4,769,100 | 9/1988 | Short et al. | 156/285 |
| 4,911,978 | 3/1990 | Tsubone et al. | 428/36.5 |
| 4,943,459 | 7/1990 | Nedzu | 428/36.5 |

Primary Examiner—William J. Van Balen

[57] ABSTRACT

A protective and decorative sheet material, such as a paint-coated film, which is bonded by an adhesive layer and vacuum thermoforming to an exterior automobile body panel as a substitute for spray painted finishes, can develop surface roughness when exposed to excessive heat for extended periods of time. This defect is unexpectedly reduced or eliminated by employing a foamed, pressure-sensitive adhesive layer.

10 Claims, 1 Drawing Sheet

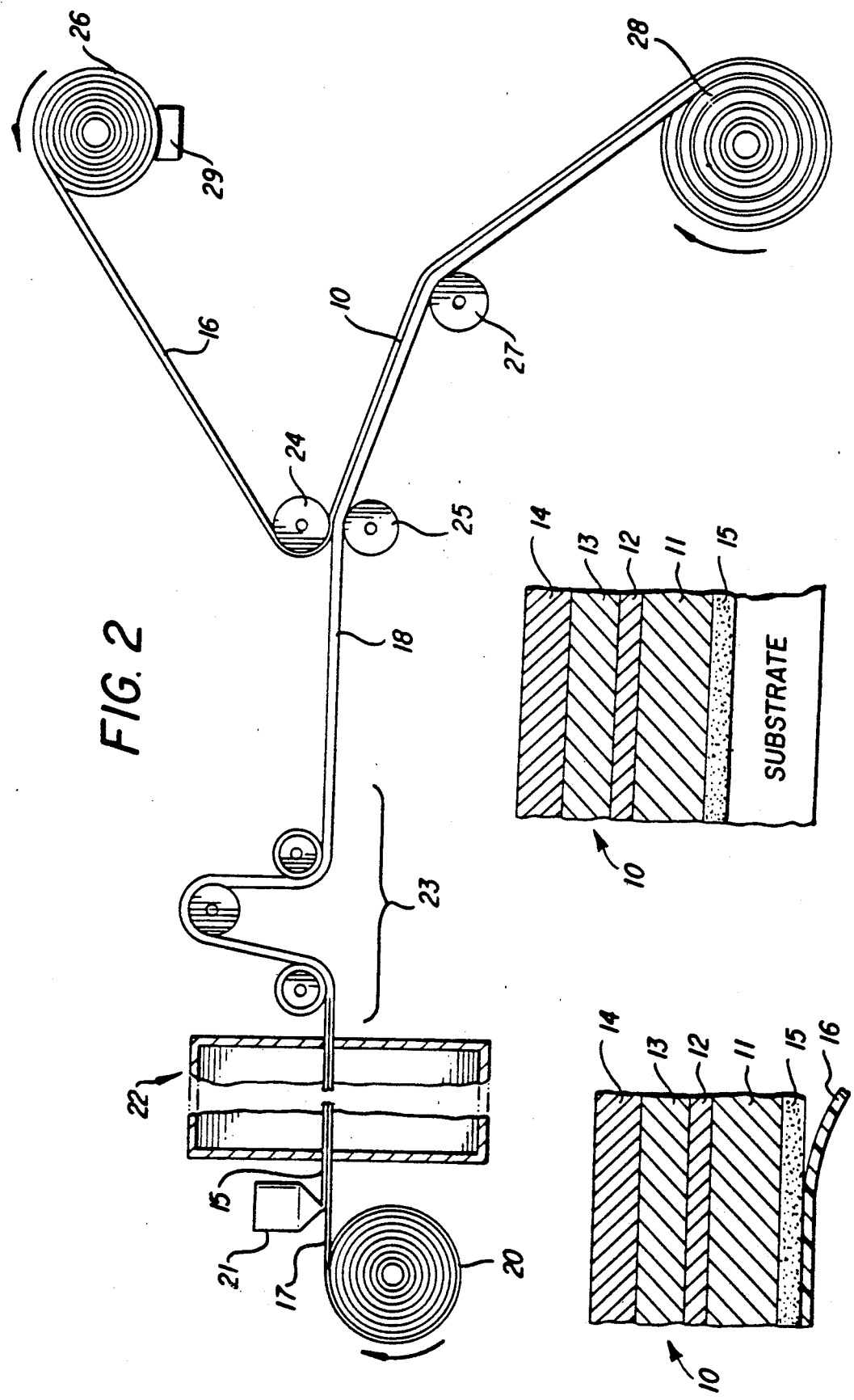

PROCESS FOR THE MANUFACTURE OF PAINT-COATED FILM AND PRODUCT PRODUCED THEREFROM

FIELD OF THE INVENTION

This invention relates to the manufacture of flexible, thermoformable sheet materials that are capable of being stretched and adhesively bonded to a three-dimensional substrate to form a protective and decorative surface thereon. It also relates to articles having adhesively bonded thereto such a sheet material.

BACKGROUND OF THE INVENTION

As an improvement over the spray painting of articles such as automobile bodies, boats and household appliances, a new kind of paint-coated sheet material (also called paint-coated film) has been developed to provide protective and decorative finishes. The new material comprises a flexible, stretchable, thermoplastic carrier film which has a protective and decorative paint layer of uniform thickness and appearance on one side, and, optionally, an adhesive layer on the other side. It can also have other layers such as a tie or bonding layer between the paint layer and the carrier film. In a preferred embodiment, a transparent topcoat covers the paint layer to provide an attractive basecoat-clearcoat appearance. Such a sheet material is disclosed in the copending patent application of Reafler, Ser. No. 116,426, filed Nov. 3, 1987, now abandoned, and in the corresponding European Patent Office application WO89/04257 published May 18, 1989. These and the other cited applications and patents are incorporated herein by reference.

In the Reafler sheet materials, the carrier film has heat-softening and tensile elongation properties which adapt it to use in thermoforming. The various layers have compatible heat-softening and tensile elongation properties. As a result, the sheet material can undergo substantial elongation during thermoforming without crazing or delamination of the layers.

In use, the paint-coated film is stretched and bonded by thermoforming to a substrate such as a three-dimensional automobile panel. The procedure of thermoforming can be substantially as described in the patent to Short et al, U.S. Pat. No. 4,769,100 wherein the film is heated and then drawn by vacuum into bonding contact with the substrate. Notwithstanding its excellent thermoforming characteristics, this high quality sheet material can develop surface roughness after it has been bonded to a substrate such as the exterior of an automobile when it is exposed to excessive heat for extended periods of time.

A vacuum forming process for adhesively bonding a thermoplastic sheet to an interior automobile panel is described in U.S. Pat. No. 3,551,232 issued Dec. 29, 1970. The objective of this patent is to overcome the problems of bubbling and blistering of the thermoplastic sheet that tend to occur in the vacuum forming process. It achieves this by use of an adhesive containing an inert particulate filler which minimizes the entrapment of air. The use of an adhesive composition that contains granular particles is not believed to be conducive to obtaining a smooth surface. Furthermore, in the case of exterior automobile panels, it is necessary not only to prevent air entrapment during thermoforming, but also to avoid later development of surface roughness.

U.S. Pat. Nos. 4,059,466; 4,059,714 and 4,156,754 are directed to methods of making and using hot melt foamed adhesives which are said to have an increased bonding strength and to be useful for packaging when a quick setting time of the adhesive is designed.

U.S. Pat. No. 3,523,846 relates to the production of porous, self-adhesive tapes by converting a visco-elastic self-adhesive mass into a fine vesicular condition by evaporation and transferring a layer of the mass to a porous base under pressure.

U.S. Pat. No. 3,380,866 to T. O. Glinter, discloses the use of a polyester adhesive containing a blowing agent for reducing stresses that develop during the bonding of reinforced resin components.

While the above-cited patents relate to the preparation and use of liquid adhesives, none of them offer any suggestion that the use of a foamed adhesive for the bonding of a flexible, stretchable paint-coated film, to a substrate which is subject to high-temperature weathering conditions will prevent roughening or texturing of the bonded film.

SUMMARY OF THE INVENTION

This invention provides a process for the manufacture of a flexible and stretchable sheet material adapted for bonding by an adhesive layer and vacuum thermoforming to a three-dimensional substrate so as to provide a smooth protective and decorative coating thereon which resists formation of surface roughness when heated. The process comprises: providing a paint-coated film comprising a stretchable, thermoplastic carrier film having coated on a first surface thereof a paint layer and a clearcoat; dispersing gas bubbles in a fluid, pressure-sensitive adhesive to form a foamed composition, coating the foamed adhesive composition onto a second surface of the carrier film, drying the adhesive coat, and thereby obtaining paint-coated film which, when adhesively bonded to a substrate, maintains a smooth, glossy basecoat-clearcoat finish when heated to 93° C. (200° F.) for 1 hour.

The present invention offers a solution to the problem of surface roughness that may develop in thermoformed and adhesively bonded sheet materials such as paint-coated film during their exposure to excessive heat. It can be used alone or in combination with other procedures designed to overcome such problems. No expensive equipment is required. Nor is it necessary to substantially modify established manufacturing procedures.

THE DRAWINGS

The invention will be further described with reference to the drawings of which

FIG. 1 shows an enlarged cross-section, not to scale, of a protective and decorative sheet material made by the process of the invention;

FIG. 2 is a diagrammatic sideview of apparatus with which the process of the invention can be carried out; and FIG. 3 is a fragmentary cross-sectional view of a paint-coated article in accordance with this invention.

DETAILED DESCRIPTION

The invention is described herein with particular reference to the manufacture of thermoformable, decorative and protective sheet materials used in the automotive industry. The surface smoothness of automotive finishes is extremely important and therefore, the high quality of the paint-coated films is especially important in that field. However, the process of the invention can be used in the manufacture of any stretchable, thermoformable web having a pressure-sensitive adhesive layer by which the web is bonded to a substrate. For example, the web can be a a paint-coated stretchable film, as exemplified herein, or such a film having other kinds of coatings, or even an uncoated stretchable film which could be pigmented or clear.

FIG. 1 is a diagrammatic cross-sectional side view, not to scale, of a thermoformable sheet material 10 made by the method of this invention. The sheet material comprises a thermoplastic carrier film 11 which is an essentially planar, self-supporting, stretchable, thermoplastic polymer film which can be transparent, translucent or opaque. It has a substantially uniform thickness in the range from about 0.05 to 0.40 millimeters.

The carrier film, which can, for example, be any of the materials disclosed in the Reafler application cited above, has heat-softening and tensile elongation properties suitable for the thermoforming process. Preferred polymeric materials for the film are those known to be useful in thermoforming and/or vacuum forming techniques, such as polyvinyl chloride, polyvinyl acetate, ABS (acrylonitrile-butadiene-styrene) resins, polyethylene and polypropylene. Useful carrier film materials include the polyacrylate blends with copolyesters described in U.S. Pat. No. 4,246,318, and the copolyesters derived from aromatic polyesters and glycol polyesters described in U.S. Pat. No. 4,287,325. Blends of rubber-modified styrene-maleic anhydrides with polycarbonates and/or polyesters are also useful, as are blends of poly(ether-esters) and polyesters. Particularly preferred carrier film materials exhibit a tensile elongation at break of at least about 40 percent when measured in accordance with ASTM D-638. A highly preferred carrier film material is a blend of copolyesters based on poly(1,4-cyclohexylenedimethylene terephthalate) and rubber-modified styrene-maleic anhydride copolymers as described in U.S. Pat. No. 4,582,876. A specific example of a polymer blend of this kind which can be extruded as a carrier film consists of a blend of 55:45 percent by weight of a copolyester and "Dylark 600" syrene copolymer. The latter is a rubber-modified styrene-maleic anhydride copolymer obtained from ARCO Chemical Company, a division of Atlantic Richfield Company. The copolyester is derived from terephthalic acid, 19 mole % ethylene glycol and 81 mole % 1,4-cyclohexanedimethanol.

Other examples of stretchable carrier films include the highly flexible and stretchable films which are made by the extrusion of blends of a flexible poly(etherester) with a more rigid polyester as described in U.S. Pat. No. 4,904,748 of Seymour, issued Feb. 27, 1990. The carrier film can include fillers, UV absorbers, plasticizers, colorants, antioxidants, etc., known to be useful in polymeric films.

Coated on the carrier film 11 is a basecoat (or paint layer) 13 which has a mean dry thickness in the range from about 0.012 to 0.080 millimeters. Preferred basecoat compositions are aqueous dispersions of a film forming binder resin and pigment with one or more organic solvents which serve as coalescing agents or the like.

Basecoat layers for the sheet materials as disclosed, e.g., in the cited Reafler application, comprise a colorant incorporated in a film forming binder. Conventional colorants for paint compositions can be employed, including inorganic pigments such as iron oxide, chromium oxide, lead chromate, carbon black, metallic oxides, silicates, chromates, etc., and organic pigments or dyes, such as phthalocyanine blue, phthalocyanine green, carbazole violet, indanthrone blue, quinacridone violet, perylene reds, diazo red and others know to those skilled in the art.

The basecoat layer can contain any light-reflective particles conventionally employed in paints, particularly those employed in automotive finish paints. Suitable reflective particles include metallic flakes such as aluminum flake, copper flake, bronze flake, copper bronze flake, nickel flake, zinc flake, magnesium flake, silver flake, gold flake, platinum flake and other platelets such as mica, glass, stainless steel, coated mica, coated glass and aluminum coated polyester film fragments. Mixtures of two or more types of particles can be used. Although not all of these light-reflective flakes are metals, they give a metallic appearance to the paint-coated film. Hence for convenience, all paints which contain light-reflective flakes are referred to as metallic paints.

Although not always essential, a thin tie-layer 12 can be coated and dried on the carrier film before the basecoat layer is coated, in order to improve the bonding of the basecoat to the carrier film 11.

Tie-layers can be formed from compositions such as "WITCOBOND" described in U.S. patent application Ser. No. 313,198 filed Feb. 17, 1989, which comprises an adhesion promoting species and optionally a solvent. The tie-layer preferably has a thickness not greater than about 0.0025 millimeter and preferably is much thinner than the pigmented inner layer applied to it.

Clearcoat layer 14 is a transparent topcoat, as described in the Reafler application, having a mean dry thickness in the range from about 0.010 to 0.70 millimeters and preferably comprises a crosslinked polymer such as a crosslinked polyurethane formed by mixing a polyester polyol and a polyisocyanate curing or crosslinking agent.

Compositions for the clearcoat layer 14 in FIG. 1 are two-component crosslinkable polymeric compositions which are useful as clearcoats for automotive surface finishing. They are transparent and comprise (a) as one component, a crosslinkable polymeric polyol such as a polyester polyol, a polyurethane polyol, or polyether polyol and (b) as a second component, a polyisocyanate curing or crosslinking agent Each component is dissolved in a volatile organic solvent such as acetone, toluene or a mixture of acetone and toluene.

Especially preferred for the clearcoat is a two-package system comprising a polyurethane polyol and a poly isocyanate crosslinking agent as disclosed in the patent to Porter, U.S. Pat. No. 4,719,132. The isocyanate component can be either an aliphatic or an aromatic polyisocyanate containing two or more isocyanate groups. Examples include 1,6-hexamethylene diisocyanate supplied by Mobay Chemical Company as KL5244. Other examples include toluene diisocyanate, 4,4-methylene-bis(cyclohexyl isocyanate) and the isocyanurate from isophorone isocyanate supplied by Veba Company as T1890. Also useful are blocked polyisocyanates which unblock when the coating composition is heated to curing temperature. Aliphatic isocyanates are greatly preferred because of their superior resistance to discoloring.

Other useful clearcoat compositions include those described in the patents to Ambrose et al, U.S. Pat. No. 4,699,814; Simpson et al, U.S. Pat. No. 4,650,718; Singer et al, U.S. Pat. No. 4,681,811; Singer et al, U.S. Pat. No. 4,703,101; and Backhouse, U.S. Pat. No. 4,220,679 and U.S. Pat. No. 4,403,003. Subsequently, coated on the carrier film 11 opposite the paint layer 13 is an adhesive layer 15, i.e., the layer with which the process of this invention is specifically concerned.

Preferred adhesives for this layer are acrylic compositions, as disclosed, e.g., in the Reafler application, including acrylic copolymers of a higher alkyl acrylate such as 2-ethylhexyl acrylate copolymerized with a polar comonomer such as acrylic acid, acrylamide or maleic anhydride, a preferred composition being the aqueous acrylic adhesive, SHRINK WRAP ADHESIVE HC7803-VAC, supplied by PPG Industries, Inc. The adhesive is coated from a solution with water or an organic solvent which also can contain additives such as a tackifier resin. Further examples of useful acrylic pressure-sensitive adhesives are described in the patent to Traynor et al, U.S. Pat. No. 4,726,982 of Feb. 23, 1988.

Following the application of the adhesive layer 14, the sheet material is interwound with a thin releasable protective web 16 of, e.g., polyester film, to permit tack-free winding of the sheet material 10 on a core. A preferred method of interwinding a protective web with the sheet material is disclosed in Hakiel et al, U.S. patent application Ser. No. 272,271 filed Nov. 17 1988.

The method by which the layers of the product are formed uniformly on the carrier film preferably is laminar flow coating, as disclosed in the cited Reafler patent application Ser. No. 116,426. filed Nov. 3, 1987. Also they are dried, as disclosed in the Reafler patent application and in U.S. Pat. No. 4,872,270 of Fronheiser, et al, by means of a flat bed dryer having a vertical loop curing section and being provided with low velocity streams of heated air.

Although laminar flow coating of the layers is highly preferred because of the excellent quality of such coatings and because of the control of environmental emissions that laminar flow coating affords, the layers can be applied by less desirable methods. Other such coating methods that have been proposed for paint-coated films include spraying and reverse roll coating as described in, for example, the patent to Short et al, U.S. Pat. No. 4,769,100 (General Motors), European Patent Application 285,071 A2, published Oct. 5, 1988 (Avery International Corp.); European Patent Application 266,109 A2 published May 4, 1988 (Rexham Corp.) which corresponds to U.S. Pat. No. 4,810,540; European Patent Application 230,364 published July 29, 1987 (3M Company); and Research Disclosure No. 24303, July 1984.

Although the Reafler sheet material is the preferred film for use in the thermoforming method of the invention, the new method can also use other paint-coated films, several of which have been reported in recent patents and literature. See, for example. Short et al, U.S. Pat. No. 4,769,100; published European Patent Application 0230364; published July 29, 1987; and SAE Technical Paper Series 890352, presented Feb. 27–Mar. 6, 1989, all of which are said to be useful in vacuum thermoforming. All of these references disclose examples of films believed to be useful, to a greater or lesser degree, in applicant's process.

FIG. 2 is a diagrammatic illustration of one form of apparatus for practicing the invention:

Coated sheet material 17, comprising carrier film 11 plus layers 12–14 as shown in FIG. 1, is fed continuously from supply roll 20 opposite coating means 21 for applying a layer of pressure-sensitive adhesive 15 from a foamed adhesive composition prepared as described more specifically hereinafter. The adhesively coated sheet material is then transported as sheet material 18 through drying means 22 to the nip formed by pressure rollers 24 and 25 for interwinding with protective web 16 being unwound from supply roll 26. An optional braking means 29 can be used to control the tension in web 16 as it is releasably bonded to web 18. As disclosed in Hakiel et al, Ser. No. 272,271 filed Nov. 17, 1988, control of the web tension aids in prevention of wrinkling of the laminated release sheet. The releasably laminated web 10 is then drawn over guide roller 27 onto take-up roll 28.

A distinguishing feature of applicant's invention is the use of an adhesive coating composition which is converted into a foaming consistency prior to its application as layer 15 to the carrier film of a sheet material as cross-sectionally exemplified in FIG. 1.

The adhesive composition can be converted into a foam by a variety of techniques. A readily applicable technique takes the form of mechanical stirring at a rate and for a duration sufficient to create a uniform dispersion of gas bubbles throughout the liquid composition.

Other techniques include:

a) the dispersing of gas bubbles throughout the adhesive composition by forcing the gas into the composition under pressure via an immersed tube;

b) introducing a gas by any convenient means and then heating the adhesive composition to create the foaming consistency by convection;

c) adding a liquid or solid blowing agent to the adhesive and then causing the agent to decompose, such as by heating, to release a gas.

It should be noted that, whatever the dispensing technique applied, the viscosity of the foamed adhesive composition must remain low enough to attain a smoothly coated layer.

The invention is further illustrated by the following examples.

EXAMPLE 1 (COMPARISON)

A carrier film was prepared from a blend described in U.S. Pat. No. 4,582,876 as follows.

A mixture of 55:45% by weight of polyester (1) and Dylark ® Styrene Copolymer 600 was compounded by extrusion. Polyester (1) was derived from terephthalic acid, 19 mole % ethylene glycol and 81 mole % 1,4-cyclohexanedimethanol. Dylark ® Styrene Copolymer 600 is a rubber modified styrene-maleic anhydride copolymer available from ARCO Chemical Company, a division of Atlantic Richfield Company.

The blend was heated to 260°–290° C. and extruded through a die into a nip comprising two temperature-controlled chrome plated stainless steel rollers. The extruded web was then cooled on a chill roller. The thermoplastic film had a mean thickness of about 0.2 mm and a maximum thickness deviation of less than 0.02 mm.

The carrier film prepared as described was coated with a thin layer of an aqueous tie-coat composition as described in Table I. After drying, the thickness of the tie-layer was approximately 0.0005 mm.

TABLE I

| Tie Coat Composition | |
|---|---|
| Ingredient | Approx. % Weight |
| Melamine-Formaldehyde Resin | 1 |

TABLE I-continued

| Tie Coat Composition | |
|---|---|
| Ingredient | Approx. % Weight |
| Ethylene Glycol Monohexyl Ether | <1 |
| Deionized Water | 75 |
| Toluene | 1 |
| Normal Butyl Alcohol | <1 |
| N,N-Diethyl Ethanolamine | <1 |
| N-Methylpyrrolidone | 2 |
| Diethylene Glycol Monobutyl Ether | 1 |
| Acrylic Resin* | 9 |
| Urethane Resin** | 9 |
| FC170 Surfactant, sold by 3M Co. | 0.05 |
| diluted with water to a total solids content of 3.0% by weight | |

*Styrene-butyl acrylate-butyl methacrylate terpolymer
**Reaction product of methylene dicyclohexyl diisocyanate and an aliphatic diol Over the dried tie-layer was then coated an aqueous polyurethane (white) paint composition as listed in Table II. The resulting layer was dried to a thickness of about 0.04 mm.

TABLE II

| Paint Composition | |
|---|---|
| Ingredient | Approx. % Weight |
| Titanium Dioxide | 20-25 |
| Ethylene Glycol Monohexyl Ether | 2-5 |
| Diethylene Glycol Monobutyl Ether | 2-5 |
| Deionized Water | Balance |
| N,N-Dimethyl Ethanolamine | 1-2 |
| N-Methylpyrrolidone | 2-5 |
| Urethane Resin | 15-20 |
| Melamine Formaldehye | 1-2 |
| Toluene | 1-2 |
| N-butyl Alcohol | <1 |

Over the dried paint layer was coated a clearcoat layer of the composition described in Table III.

TABLE III

| Clearcoat Composition | | |
|---|---|---|
| | Ingredient | Approx. % Weight |
| A | Urethane Resin | 60 |
| | Toluene | 39 |
| | Benzotriazole | 1 |
| B(*) | Polyfunctional aliphatic isocyanurate resin based on 1,6-hexamethylene diiocyanate | 100 |

(*)Available as Desmodur N-3300 from Mobay Corporation Coatings Division

Ingredient A diluted to 53% with acetone and Ingredient B diluted to 70% solids with a 50/50 mixture of acetone and toluene were mixed and coated onto the paint layer and dried to form a clear layer having a thickness of 0.06 mm.

The dried, clear-coated sheet material was wound on a take-up roll, then unwound, and once more drawn through a coating station to form on the backside of the carrier film opposite the tie-layer a thin layer of a pressure-sensitive adhesive which, upon continuous drying to a tacky state, had a thickness of 0.07 mm. The adhesive was a clear, aqueous acrylic adhesive comprised of 50 weight percent water and 50 weight percent acrylic resin. It is supplied as "Shrink Wrap Adhesive HC7803-VAC" by PPG Industries, Inc. of Pittsburgh, Pa.

A thin polyester film having a thickness of about 0.04 mm was applied to the backside adhesive layer as a temporary protective release sheet to permit handling of the sheet material prior to its use.

After removal of the protective release sheet from the backside of the carrier film, a 7.5 × 16 inch sample of the material was drawn by vacuum thermoforming into contact with an inclined metal test panel and adhesively bonded thereto. The sample was heated by infrared lamps to 135° C. before initiating the vacuum drawdown. As it was drawn onto the inclined test panel, the sample was stretched an amount proportional to the distance along the panel, the area at the top of the panel having little or no stretch and the area at the bottom having maximum stretch. The finished product consisting of the test panel having the paint-coated film bonded thereto had an excellent smooth surface appearance, including good gloss and distinctness of image in unstretched as well as stretched areas. The product was then subjected to a high-temperature treatment at 93° C. (200° F.) for one hour and allowed to cool to room temperature. The so treated product was visually inspected and found to have lost its initial surface smoothness and developed a rough, textured surface under the influence of the excessive heat.

EXAMPLE 2 (INVENTION)

The procedure described in Example 1 was repeated with a sample of a sheet material whose adhesive bonding layer had a foamy consistency which was produced by mechanically dispersing gas bubbles throughout the liquid adhesive composition prior to its application to the carrier film. The bubble dispersion was obtained by stirring the coating composition with an air-powered, high-speed mixer equipped with a marine propeller revolving at about 2,500 RPM. The stirring action was sufficient to create a vortex in the adhesive composition, along with a slight rise of its viscosity to a level at which smooth coatability was retained. The finished product was subjected to the high-temperature treatment described in Example 1 and visually inspected.

In contrast to the results observed in Example 1, this second sheet material had retained its initial smoothness by withstanding the development of a rough, textured surface during the post-bonding heat treatment.

The invention has been described in detail with particular reference to certain preferred embodiments thereof, but it will be understood that variations and modifications can be effected within the spirit and scope of the invention.

What is claimed is:

1. A process for the manufacture of a flexible and stretchable sheet material adapted for bonding by an adhesive layer in a thermoforming process to a three-dimensional substrate so as to form a smooth protective and decorative coating thereon which resists formation of surface roughness when heated to 93° C. for 1 hour, said process comprising the steps of:
   (1) providing a paint-coated film comprising a stretchable, thermoplastic carrier film having coated on a surface thereof a paint layer and a clearcoat;
   (2) dispersing bubbles of gas in a fluid, pressure-sensitive adhesive to thereby form a foamed adhesive composition;
   (3) coating said foamed adhesive composition onto the paint-coated film on the surface of the carrier film opposite to said paint layer; and
   (4) drying the coating of said foamed adhesive composition.

2. A process according to claim 1 wherein said gas is air.

3. A process according to claim 1 wherein said gas is nitrogen.

4. A process according to claim 1 wherein said gas bubbles are dispersed in said adhesive composition by mechanical stirring.

5. A process according to claim 1 wherein said gas bubbles are dispersed in said adhesive composition by forcing said gas into said adhesive.

6. A process according to claim 1 wherein said gas bubbles are dispersed in said adhesive by a blowing agent which when heated is capable of releasing a gas.

7. A process according to claim 1 wherein said fluid pressure-sensitive adhesive composition contains a blowing agent which when heated is capable of releasing a gas and said gas bubbles are disposed in said adhesive composition by heating said blowing agent.

8. A bonded article comprising a thermoformed protective and decorative sheet material bonded to a substrate and having the appearance of a glossy clearcoat/basecoat finish and which is resistant to the formation of surface roughness upon exposure to heat, said sheet material comprising a stretchable, thermoplastic polymeric carrier film having heat-softenable and tensile elongation properties which adapt it to use in vacuum thermoforming;

said carrier film having on one surface thereof a paint layer and a clearcoat and on the other surface thereof a foamed adhesive layer providing the bond between the substrate and the carrier film of the sheet material.

9. A protective and decorative sheet material suitable for bonding to a three-dimensional substrate to provide a glossy finish that is resistant to the formation of surface roughness upon exposure to heat, said sheet material comprising a stretchable, thermoplastic polymeric carrier film having heat-softenable and tensile elongation properties which adapt it to use in vacuum thermoforming;

said carrier film having on one surface thereof a glossy paint layer and on the other surface thereof a foamed adhesive composition.

10. The material of claim 9, wherein said adhesive composition is a pressure-sensitive, acrylic adhesive.

* * * * *

UNITED STATES PATENT AND TRADEMARK OFFICE
CERTIFICATE OF CORRECTION

PATENT NO. : 5,034,269
DATED : July 23, 1991
INVENTOR(S) : Richard W. WHEELER It is certified that error appears in the above-identified patent and that said Letters Patent is hereby corrected as shown below:

On the title page, Item [73], Assignee: Eastman Kodak Company, Rochester, New York.

Signed and Sealed this

Thirtieth Day of March, 1993

Attest:

STEPHEN G. KUNIN

*Attesting Officer*   Acting Commissioner of Patents and Trademarks